US010972875B2

(12) United States Patent
LeJeune, Jr.

(10) Patent No.: US 10,972,875 B2
(45) Date of Patent: *Apr. 6, 2021

(54) SYSTEM AND METHOD OF ALTERNATIVE TRACKING UPON DISABLING OF MONITORING DEVICE

(71) Applicant: SATELLITE TRACKING OF PEOPLE LLC, Houston, TX (US)

(72) Inventor: David W. LeJeune, Jr., Conroe, TX (US)

(73) Assignee: SATELLITE TRACKING OF PEOPLE LLC (*) Notice: Subject to any disclaimer, the term of this patent is extended or adjusted under 35 U.S.C. 154(b) by 0 days.

This patent is subject to a terminal disclaimer.

(21) Appl. No.: 16/799,277

(22) Filed: Feb. 24, 2020

(65) Prior Publication Data
US 2020/0252753 A1 Aug. 6, 2020

Related U.S. Application Data

(63) Continuation of application No. 15/967,804, filed on May 1, 2018, now Pat. No. 10,602,317.

(51) Int. Cl.
G08B 1/08 (2006.01)
H04W 4/029 (2018.01)
H04W 4/90 (2018.01)
H04W 4/38 (2018.01)
H04W 4/02 (2018.01)

(52) U.S. Cl.
CPC .......... *H04W 4/029* (2018.02); *H04W 4/025* (2013.01); *H04W 4/38* (2018.02); *H04W 4/90* (2018.02)

(58) Field of Classification Search
CPC ......... H04W 4/029; H04W 4/38; H04W 4/90; H04W 4/025
USPC ..................................... 340/539.13
See application file for complete search history.

(56) References Cited

U.S. PATENT DOCUMENTS

| 5,867,103 | A | * | 2/1999 | Taylor, Jr. | G08B 21/00 340/539.1 |
| 6,160,481 | A | * | 12/2000 | Taylor, Jr. | G16H 40/67 340/573.4 |
| 7,769,394 | B1 | | 8/2010 | Zhu | |
| 7,982,609 | B2 | | 7/2011 | Padmanabhan et al. | |
| RE44,085 | E | * | 3/2013 | Taylor, Jr. | 340/573.4 |

(Continued)

*Primary Examiner* — Kerri L McNally
*Assistant Examiner* — Thang D Tran
(74) *Attorney, Agent, or Firm* — Polsinelli PC

(57) ABSTRACT

A method and system for locating a fugitive with a disabled personal monitoring device is provided. The method includes: providing a monitored individual with a personal monitoring device being: (a) secured to the monitored individual, (b) configured to determine a location of the personal monitoring device at particular times, and (c) configured to upload the determined location of the personal monitoring device at the particular times; storing the uploaded location data to thereby create a movement history of the monitored individual; cross referencing at least a portion of the movement history with a record of detected probe signals emitted by wireless devices to thereby identify wireless devices that the personal monitoring device has encountered; selecting, based on at least one predetermined rule, a wireless device identified by the cross referencing; determining a relevant location of the wireless device; and notifying a supervising authority of the relevant location.

26 Claims, 15 Drawing Sheets

(56) References Cited

U.S. PATENT DOCUMENTS

| | | | |
|---|---|---|---|
| 8,400,268 B1* | 3/2013 | Malik | G06Q 10/06 340/8.1 |
| 8,478,297 B2* | 7/2013 | Morgan | H04W 4/02 455/456.1 |
| 8,514,070 B2 | 8/2013 | Roper et al. | |
| 8,774,752 B1 | 7/2014 | Akcasu et al. | |
| 9,401,082 B2* | 7/2016 | Rajala | G06F 1/169 |
| 9,563,995 B2* | 2/2017 | Freathy | A61B 5/1112 |
| 10,019,887 B1 | 7/2018 | LeJeune, Jr. | |
| 2002/0024443 A1 | 2/2002 | Hawkins et al. | |
| 2002/0165992 A1 | 11/2002 | Banerjee | |
| 2005/0040944 A1* | 2/2005 | Contestabile | G08B 21/028 340/539.13 |
| 2006/0063540 A1* | 3/2006 | Beuck | G01S 5/0027 455/456.3 |
| 2006/0240840 A1* | 10/2006 | Morgan | H04W 4/029 455/456.1 |
| 2008/0176583 A1* | 7/2008 | Brachet | G01S 5/0236 455/456.3 |
| 2008/0316022 A1* | 12/2008 | Buck | G08B 21/02 340/539.13 |
| 2010/0090825 A1* | 4/2010 | Freathy | G08B 21/0286 340/539.13 |
| 2010/0090826 A1* | 4/2010 | Moran | G08B 21/0269 340/539.13 |
| 2011/0231407 A1 | 9/2011 | Gupta et al. | |
| 2012/0179812 A1 | 7/2012 | Keller, III | |
| 2012/0309420 A1* | 12/2012 | Morgan | H04W 4/029 455/456.1 |
| 2012/0315839 A1 | 12/2012 | Mumcuoglu et al. | |
| 2013/0099920 A1* | 4/2013 | Song | G08B 21/0277 340/539.13 |
| 2013/0137076 A1 | 5/2013 | Perez et al. | |
| 2014/0002575 A1* | 1/2014 | Fennell | G08B 21/22 348/14.02 |
| 2014/0031067 A1 | 1/2014 | Kubo et al. | |
| 2014/0118144 A1 | 5/2014 | Amis | |
| 2015/0082459 A1* | 3/2015 | Kelly | H04W 12/08 726/28 |
| 2015/0281401 A1 | 10/2015 | Le et al. | |
| 2015/0365448 A1 | 12/2015 | Stifelman et al. | |
| 2016/0031416 A1* | 2/2016 | Calhoun | H04W 4/90 701/483 |
| 2016/0112835 A1* | 4/2016 | McConathy | G06Q 50/265 455/456.1 |
| 2016/0155310 A1 | 6/2016 | Joao et al. | |
| 2016/0198010 A1 | 7/2016 | Roy et al. | |
| 2017/0150306 A1 | 5/2017 | LeJeune, Jr. | |
| 2017/0318047 A1 | 11/2017 | Hampel et al. | |
| 2017/0346820 A1 | 11/2017 | Valla | |
| 2017/0352250 A1 | 12/2017 | de Barros Chapiewski et al. | |
| 2017/0373871 A1 | 12/2017 | Breazeale, Jr. | |
| 2018/0139579 A1 | 5/2018 | Camps | |
| 2018/0176727 A1 | 6/2018 | Williams | |
| 2018/0192374 A1 | 7/2018 | Jain et al. | |
| 2018/0270608 A1* | 9/2018 | Thoresen | H04W 4/029 |
| 2019/0026643 A1* | 1/2019 | Muijs | H04W 4/029 |

\* cited by examiner

SYSTEM AND METHOD OF ALTERNATIVE TRACKING UPON DISABLING OF MONITORING DEVICE

CROSS-REFERENCE TO RELATED APPLICATIONS

This application is a Continuation of U.S. application Ser. No. 15/967,804, filed on May 1, 2018 entitled "SYSTEM AND METHOD OF ALTERNATIVE TRACKING UPON DISABLING OF MONITORING DEVICE", the contents of which are expressly incorporated by reference herein in its entirety.

FIELD OF THE INVENTION

Various embodiments described herein relate generally to locating a monitored person who has disabled their tracking device. More particularly, various embodiments herein relate to identifying wireless devices that have been proximate to the monitored person and investigating a location of those identified wireless devices as a possible location of the monitored person or someone who may have information about the monitored person.

BACKGROUND

The monitoring of movements of monitored individuals involves a variety of sectors, including parolees and home confinement. The technology has its roots in the home arrest systems of the 1980's, in which a user wearable component—typically a "beacon" anklet that was locked to the monitored individual—would communicate wirelessly with a stationary base unit. The range was limited to a few feet of the radio frequency transmitter and receiver. The base unit included a telephone connection for communicating with the authorities. If the monitored individual left the short range allowed by the equipment, the tag and the base unit would lose contact and the base unit would respond by sending an alert to the authorities. False alarms for minor deviations from the short range and/or an inability to confirm false from actual alarms (if the person was where they were supposed to be when the police arrived to investigate) desensitized the police to such alerts, rendering the technology of limited application to low risk offenders.

A later generation of the technology incorporated GPS and cellular telephone technology in a locked anklet. The device would actively record the location of the monitored individual over time and transmit the data to a central monitoring location (e.g., police or parole monitoring services). The central location could store and analyze the data for prohibited movements (e.g., a sex offender near a school) or cross reference the movement data with crime incident data to see if the monitored individual was near the crime at the time of the crime. U.S. Pat. Nos. 5,867,103, 6,160,481, 6,218,945, 6,512,456 and 6,703,936, incorporated herein by reference in their entireties, are each exemplary of such a system. The technology is also used to monitor other individual sectors (e.g., patients, children) and objects (e.g., cars, cargo).

The modern monitoring device includes a GPS receiver that determines location, a memory that stores location data over time to define a movement history, and a cellular modem that communicates the movement history to a central location through the cell network. A common implementation is in the criminal justice system as an alternative to incarceration, and monitored individuals (typically parolees) have tamper resistant devices attached to their leg by a band. For ease of discussion embodiments herein are directed to parolees, although the invention is not so limited.

Often a condition of parolee is that a parolee wears a personal monitoring device, and removal of the monitoring device (e.g., cutting the band that attaches it to the leg) is a parole violation that could result in revocation of parole and subsequent re-incarceration. In some jurisdictions the removal of the monitoring device is itself an independent crime and can result in additional charges and jail time. To avoid these potential consequences the overwhelming bulk of the monitored parolee population makes no effort to remove the monitoring device.

Nonetheless there are occasional violations. Once a parolee cuts the monitoring device and leaves it behind, options for locating the parolee are limited. At an electronic level, in theory the supervising authority can obtain a warrant for the cell carrier to provide the current location of the phone, but this takes time and is not useful if the parolee either does not have the phone (e.g., left it behind, switched to a burner phone). Otherwise the supervising authority is limited to standard police investigate procedures.

BRIEF DESCRIPTION OF THE DRAWINGS

Various embodiments in accordance with the present disclosure will be described with reference to the drawings, in which.

DETAILED DESCRIPTION

Figure 1:
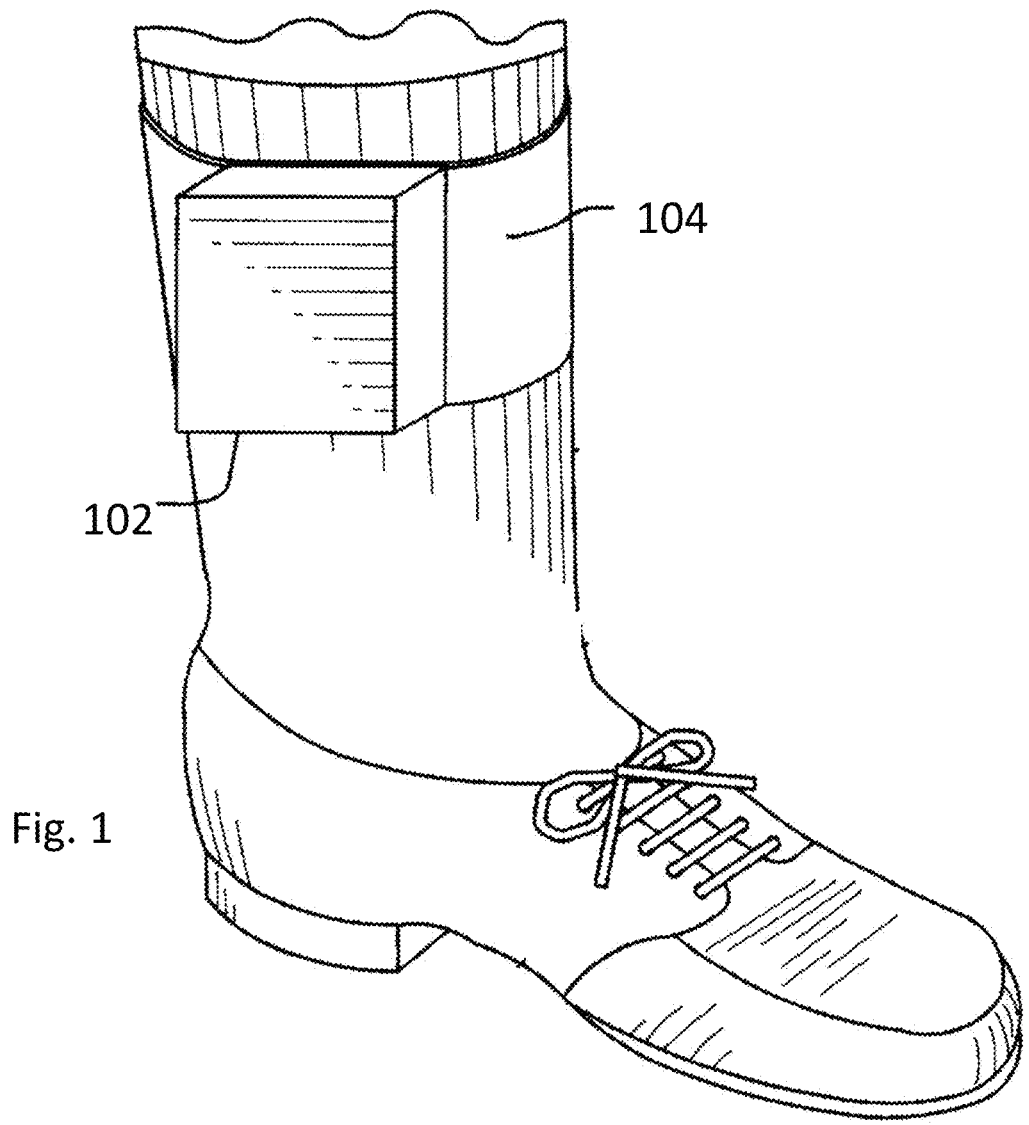
FIG. 1 illustrates an embodiment of a monitoring device attached to an ankle of a user.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. An individual skilled in the relevant art will recognize that other components and configurations may be used without departing from the scope and spirit of the claimed subject matter.

Several definitions that apply throughout this disclosure will now be presented. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series and the like. The term "a" means "one or more" absent express indication that it is limited to the singular. "First," "second," etc. are labels to differentiate like terms from each other, and does not imply any order or numerical limitation.

The phrase "monitored population" refers to a group of individuals and/or objects that have issued monitoring devices and are subject to common electronic location monitoring by an oversight system. The phrase "monitored individual" refers to a particular individual in the monitored population.

The phrase "unmonitored individual" refers to a particular individual that is not within a particular monitored population. An unmonitored individual may be under no monitoring at all, or may be a monitored individual within a different monitored population. By way of non-limiting example, jurisdictions often run their own monitoring programs based on equipment from competitors that do not share information with each other. Thus California may have an oversight system and corresponding monitored population for California residents, while Texas may have its own oversight system and corresponding monitored population for Texas residents. If the systems are not compatible or otherwise are not sharing data, then they are two different monitored populations. A monitored individual within California's system would thus be a monitored individual within the California monitored population, but an unmonitored individual within Texas' system because Texas is not monitoring that particular individual.

The phrase "general population" refers to people generally, and may include monitored and unmonitored individuals.

An "authorized individual" or "supervising authority" would be any one or more people having some type of supervisory responsibility and/or decision making relative to the monitored population or monitored individual therein. By way of non-limiting example, a parole officer would be the authorized individual relative to a parolee. Other non-limiting examples include parent/child, patient/medical supervisor, etc. Security and/or police could be considered a supervising authority relative to a population of monitored individuals to the extent the emergency level intervention is necessary. For sake of brevity, discussion herein is confined to parolee/parole officer relationship, although the invention is not so limited. The invention also applies to objects that can be monitored, such as cars or cargo.

In the concept of devices, a "mobile" device refers to wireless devices with wireless connectively that are designed to be routinely carried by individuals without access to utility power; non-limiting examples include cellular phones, tablets, PDAs and laptops. A common feature of a mobile device is an internal battery that allows for extended periods of use while away from utility electrical power. A "stationary" device refers to devices that are designed to be located for extended periods of time in a single location while operating off of utility power; non-limiting examples include desktop PC's, servers and routers.

A common feature of a stationary device is either the lack of an internal battery with corresponding full reliance on utility electrical power, or the presence of a battery (internal or external) for limited backup purposes in the case of loss of utility power. Mobile devices may at times be used as stationary devices (e.g., a laptop may be connected to utility power for an extended period of time and used at a single location), and stationary devices may at times act as mobile devices (in that at least any device can be relocated and at least for a brief period be run off of a backup power), but this does not change their classification as mobile or stationary.

In the concept of technologically determining a geographic position of a person or object, the term "location" refers to the position that the technology identifies the person or object to be, as opposed to the actual physical location of the person or object. All such tracking technologies have some degree of margin of error such that any technologically determined location will not be an exact location of the person or object. For example, under certain conditions GPS has a known margin of error within 1-5 meters, and thus the location determined for a person using GPS under those conditions may differ from their actual position by 1-5 meters. Any such technological determinations of position are thus approximate based on the underlying accuracy of the tracking technology and margin of error. Any use of "location" in the specification or claims is to be considered modified by "approximate" to account for such variation whether expressly stated or not.

"Bracelet gone" is a term of art in the parole tracking art that refers to a condition where the tracking device is not reporting location data as expected. This may be because of the device tampering (e.g., cutting the band, cracking the device casing, jamming the device), device malfunction and/or natural conditions (e.g., a cell dead zone where the device cannot report over its cellular modem) such that the device is either not reporting at all or reporting faulty data.

"Fugitive" refers to a monitored person who has disabled their monitoring device, such as by cutting the band.

"Probe signal" refers to a short range signal (on the order of hundreds of feet in range) emitted by a device with wireless connectivity methodologies that is effective to announce the device's presence and which is detectable by other wireless devices. Such signals may be to propagate the availability of the device and/or to establish a connection with another device. Non-limiting examples of wireless connectivity methodologies that utilize probe signals include Wi-Fi (which emit, e.g., "probe requests" to discover 802.11 networks within its proximity) and Bluetooth via its discovery mode (which emit, e.g., the ID of the device and a request to connect). Probe signals may be emitted by the device spontaneously or in response to outside stimulus. The invention is not limited to the any wireless connection methodology, the timing and/or contents of the signal.

Various embodiments herein relate to leveraging existing services that detect the presence of wireless devices (e.g., smartphones, tablets, hands free, laptops) and store that data for future use. These databases can be cross referenced with prior location data from the tracking device to see what wireless devices were proximate to the tracking device at particular times. For example, a wireless device which is consistently proximate to the tracking device may be the monitored person's own phone. The service can then be used to identify a location for that wireless device so that authorities can be dispatched to that location.

Tracking Devices

FIG. 1 shows a block diagram of a personal monitoring device 102 according to an embodiment of the invention.

Personal monitoring device 102 can determine its location, such as through the Global Positioning Satellite, cell towers, LORAN, wireless local access points, or other known methodologies; for sake of brevity discussion herein is confined to GPS, although the invention is not so limited. Monitoring device 102 is shown as a one-piece unit, although multiple pieces as known in the art could also be used.

A band 104 secures monitoring device 102 to a limb of the user, typically the ankle, via a locking mechanism that preferably can only be (legally) opened by an authorized individual. An ankle is shown in FIG. 1, although the invention is not limited thereto. Monitoring device 102 and band 104 preferably have tamper detection capabilities as is known in the art and not discussed further herein. The invention is not limited to any particular securing and/or tamper detection methodology.

Figure 2:
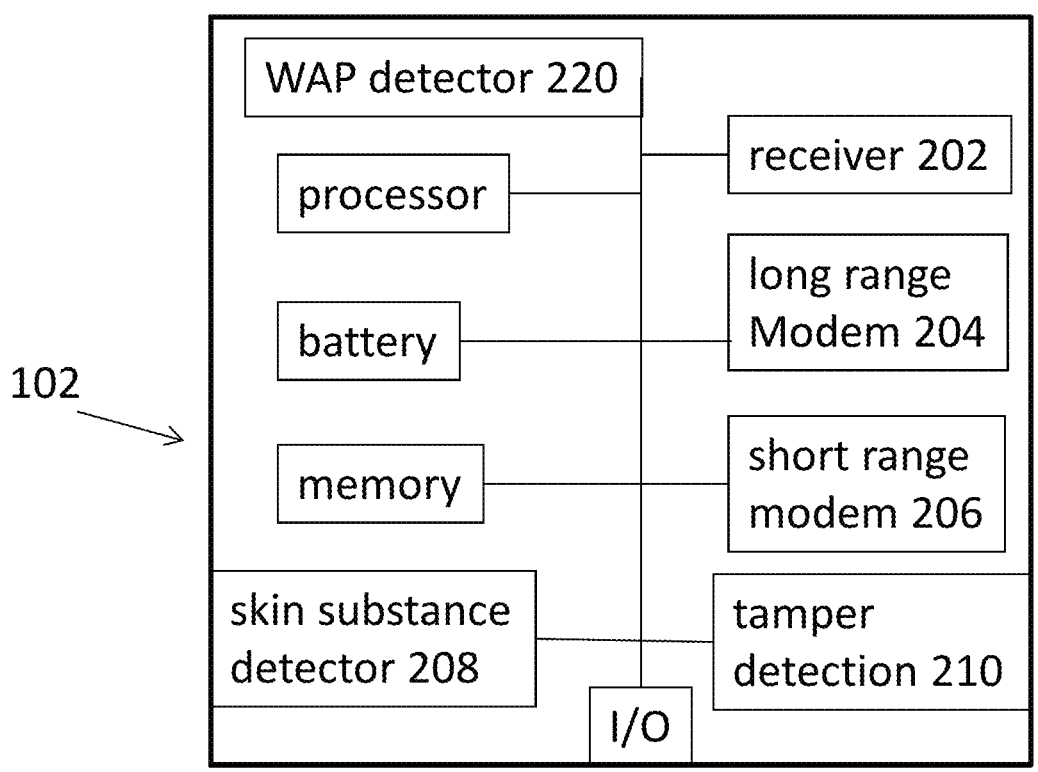
FIG. 2 illustrates an embodiment of the internal components of the monitoring device of FIG. 1.
Figure 3:
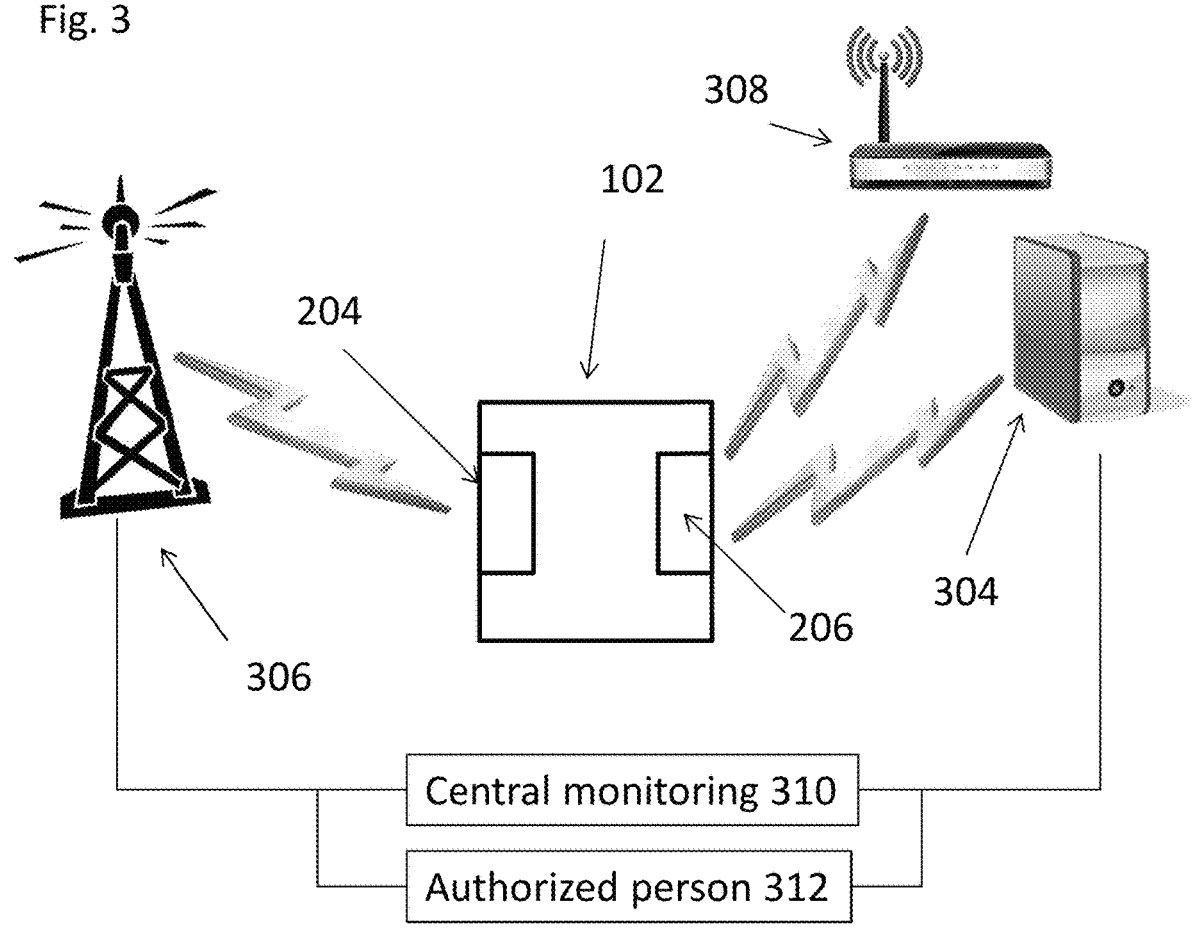
FIG. 3 illustrates an operating environment of the monitoring device of FIG. 1.

Referring now to FIG. 2, a non-limiting example of monitoring device 102 includes a dedicated circuit for determining its location, such as a GPS receiver 202. A cellular modem 204 preferably provided with a SIM card allows the monitoring device 102 to communicate through the cellular network with a central monitoring location 310 (FIG. 3). A short range wireless modem 206 (e.g., 915 MHz or 802.11 compatible Wi-Fi or Bluetooth) allows the monitoring device 102 to communicate locally with other wireless devices within the short range as is known in the art for such devices. Modems 204 and 206 may be the same modem operable to communicate on different frequencies. A substance detector 208 may be provided to monitor the presence of prohibited substances in the monitored individual, such as through a sensor in contact with the skin; the configuration of substance detectors within a portable monitored device are known by those of skill in the art and not further discussed herein. Tamper detection mechanism 210 monitors for tamper detection as is known in the art.

Monitoring device 102 may also include a wireless access point detector 220 that detects short range (e.g., maximum range on order of less than hundreds of feet) wireless access points (or "WAP") within range and records information about the detected wireless access points in the memory. By way of non-limiting example, wireless access points may be IEEE 802.11 compatible Wi-Fi hotspots that provide Internet access to network devices as are commonly known in the art of mobile phones and tablets, and the wireless access point detector 220 may be an IEEE 802.11 compatible Wi-Fi finder. In another non-limiting example, devices that communicate via Bluetooth could be wireless access points. A cellular tower is a long range point of access (maximum range on the order of miles) and would not be a short range wireless access point as understood herein.

Batteries, a power port, memory, I/O interface, wired communication access and other supporting computer hardware and software as is known in the art are also preferably provided and not discussed further herein. Monitoring device 102 may be integrated into a single unit or multiple units as is known in the art. The invention is not limited to the details of the architecture of monitoring device 102.

Referring now to FIG. 3, monitoring device 102 is shown in an operating environment. Multiple satellites 302 provide the GPS timestamps that GPS receiver 202 in monitoring device 102 converts into location information. The location information represents the approximate position of the monitoring device 102, and by extension the approximate position for the monitored individual, at a particular time. Monitoring device 102 can transmit that information as location data in near real time, and/or can store the location information as location data in memory and batch transfer collected location data as dictated by the need of the system (e.g., on a fixed and/or random schedule, or in response to an event or specific instruction to do so). If substance detection capability is present, then information relating to screening(s) may be similarly stored, transmitted in near real time or batch transmitted collectively, either with or separately from the location data.

Monitoring device 102 preferably has at least two options for remote communications, including data transfer. The first is through the short range modem 206 with a trusted home monitoring device 304 when within the range (e.g., <300 feet, more particularly about 50-100 feet) of the short range modem 206. The second is through the cell/long range modem 204 (potentially miles) to a cell tower 306 when the monitoring device is out of range of the home monitoring device 304. A third option is short range wireless modem 206 with a wireless access point 308. Preferably cell tower 306, wireless access point 308 and/or home monitoring device 304 connect to central monitoring location 310 and/or an authorized individual 312, whether directly or through intervening equipment (e.g. cell network, Internet) as known in the art.

Wireless access point detector 220 is shown in FIG. 2 as separate from modems 204 and 206, but may be part of those modems or other components. By way of non-limiting example, modem 204 could be a cellular modem, modem 206 could be a separate RF modem, and wireless access point detector 220 could be a distinct Wi-Fi modem and/or Wi-Fi finder component. In yet another example, modem 206 is a Wi-Fi network adaptor that includes Wi-Fi finder hardware and/or software, such that the wireless access point detector 220 is part of modem 206. In still yet another example, modem 204 could be a cellular modem, modem 206 could be a separate RF modem, and wireless access point detector 220 could be a distinct Wi-Fi network adaptor. The invention is not limited to the particular organization or components that define the wireless access point detector 220.

Central monitoring location 310 is "central" in the sense that it serves one or more monitoring devices 102. It may be a single location, multiple locations operating independently, or a distributed arrangement. At a most basic level the central monitoring location 310 is no more than a computer (e.g., a server) having a memory, processor, modem, input/output, and other supporting computer hardware and software as is known in the art, although in practice they may be large facilities with distributed computers and human handlers. Functionality attributed herein to central monitoring location 310 is preferably implemented by software programmed onto electronic computer hardware. The invention is not limited to the architecture or layout of the central monitoring location 310.

Figure 4:
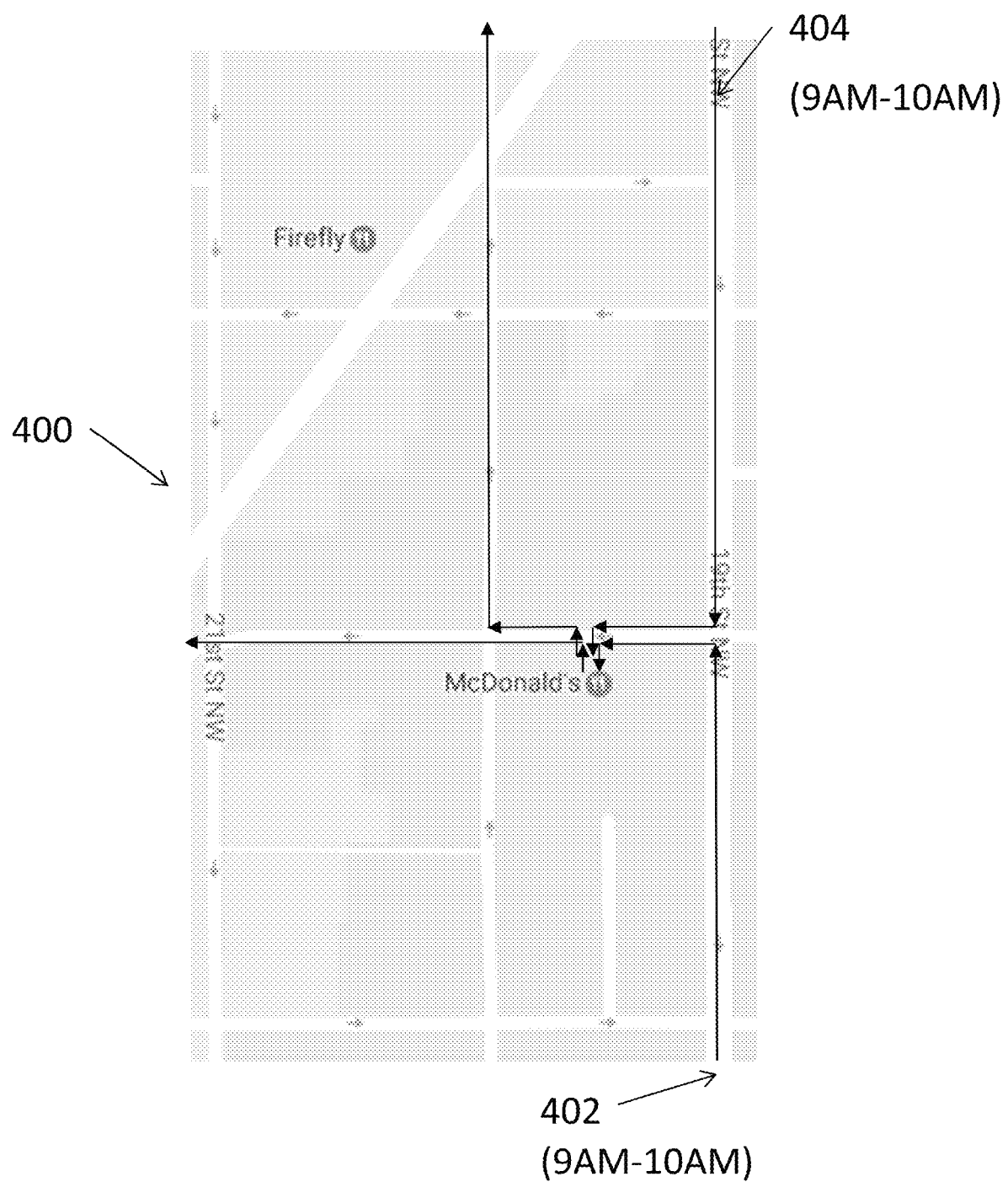
FIG. 4 illustrates movement of two monitored individuals over a common period of time with overlapping location.

A non-limiting example of a monitoring individual's movement and related information that can be derived from corresponding movement data reported by personal monitoring device 102 is shown with respect to a map 400 in FIG. 4. In FIG. 4, a monitored individual A moves along a route 402 between 9 AM and 10 AM, including a stop at a restaurant (McDonalds) for breakfast. A monitored individual B moves along a route 404 between 9 AM and 10 AM, and also stops at the same restaurant. The corresponding movement data would be recorded by their individual monitoring devices 102 and uploaded to central location 310 as described above. The corresponding data could be visually displayed at central monitoring location 310, similar in the manner to which it is shown in FIG. 4 (although more likely shown by dots representing location data at scheduled times taken along the paths).

General Population Tracking Databases

Wireless devices have the ability to wirelessly connect with other devices and access points, by way of non-limiting example, through Bluetooth, Wi-Fi access, hotspot, etc. For example, the IPHONE has options under its setting tabs to turn ON/OFF its Wi-Fi connectivity, its Bluetooth connectivity, and its personal hotspot connectivity. When any of these are in active (ON) states these wireless connectivity methodologies are periodically transmitting probe signals announcing their presence that are detectable by other wireless devices and access points. Devices of particular interest from a deployment perspective are mobile devices such as cell phones, although the invention is not limited to mobile devices or any particular type of wireless device.

A probe signal includes some type of unique device identifier for the device (e.g., its MAC ID) so that any particular wireless device is distinguishable from other wireless devices, although typically the identifier does not contain personal information that would allow the carrier/owner of the wireless device to be identified from the signal. A probe signal may also contain location information identifying the location of the mobile device, e.g., coordinates from a GPS receiver in the wireless device.

A recognized habit of the consuming public is to default at least some of these wireless device settings to active state for the convenience of seamlessly connecting to different devices and access points (e.g., link to home Wi-Fi at home, and then automatically link to office Wi-Fi when at work). As such most consumer devices are constantly transmitting probe signals.

Various services have emerged to monitor the presence of probe signals and collect this data for advertising purposes. A non-limiting example of such a service is provided by LIBELIUM. The services detect the probe signals transmitted by the various wireless devices to a local wireless access point, which acts a sensor. The process provides at least some degree of location of the wireless device, in that either the wireless device knows and reports its own location (e.g., internal GPS coordinates as may be transmitted with the probe signals) and/or the location that the wireless access point is known at least generally (due its deployment at a known location or internal location circuitry, such that the location of the wireless device is known to be within a certain range of the wireless access point). The process also provides a time stamp for when the wireless device was detected. Detection of a wireless device thus provides a device identifier at an at least approximate location at a particular time.

Figure 5A:
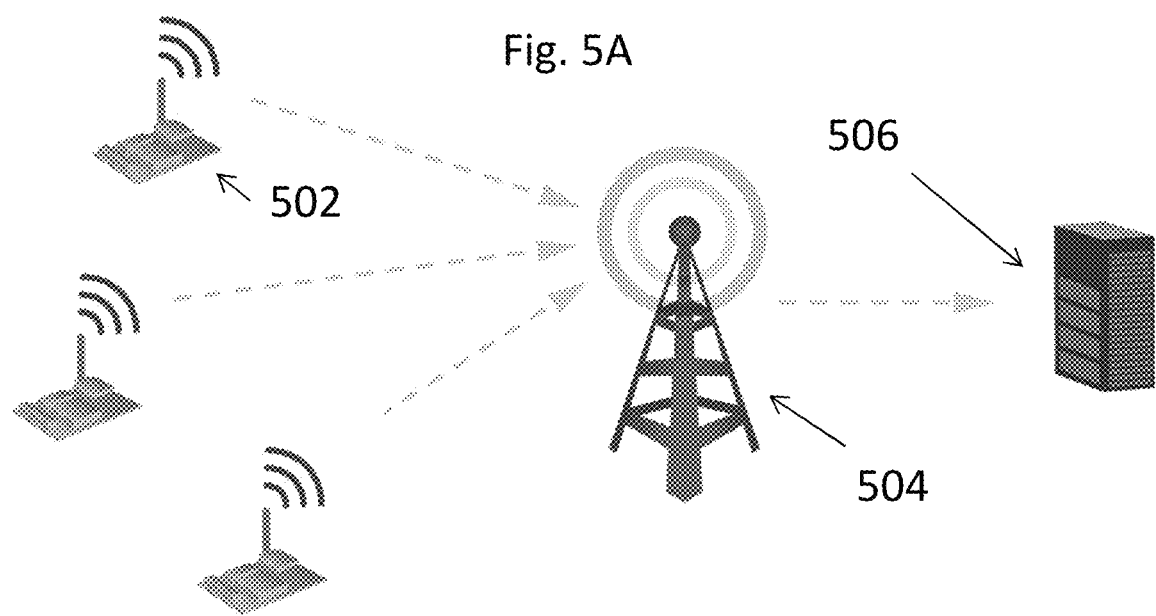
FIG. 5A illustrates an embodiment of detecting probe signals from wireless devices.
Figure 5B:
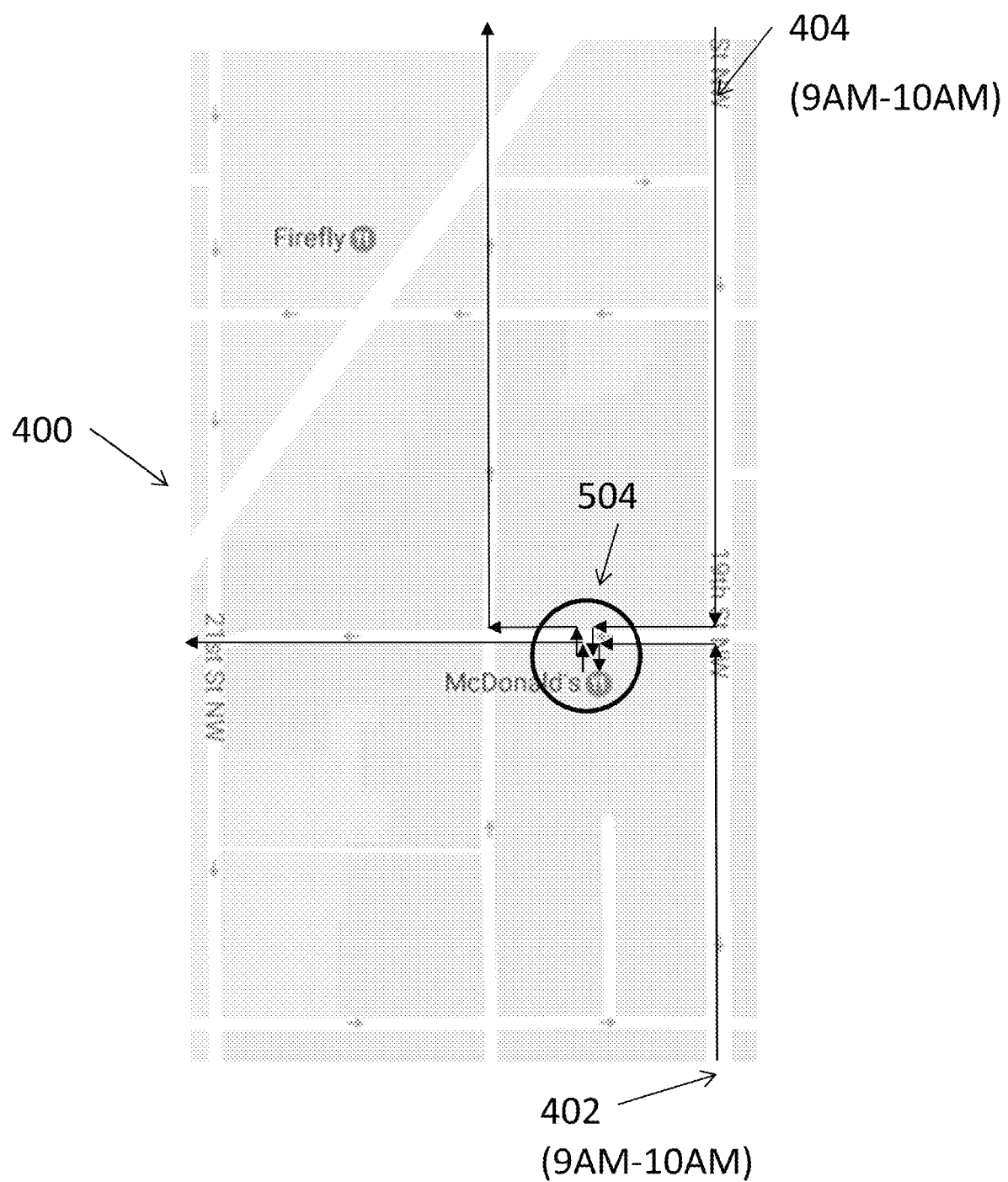
FIG. 5B illustrates movement of two monitored individuals in FIG. 4 relative to a sensor.
Figure 6:
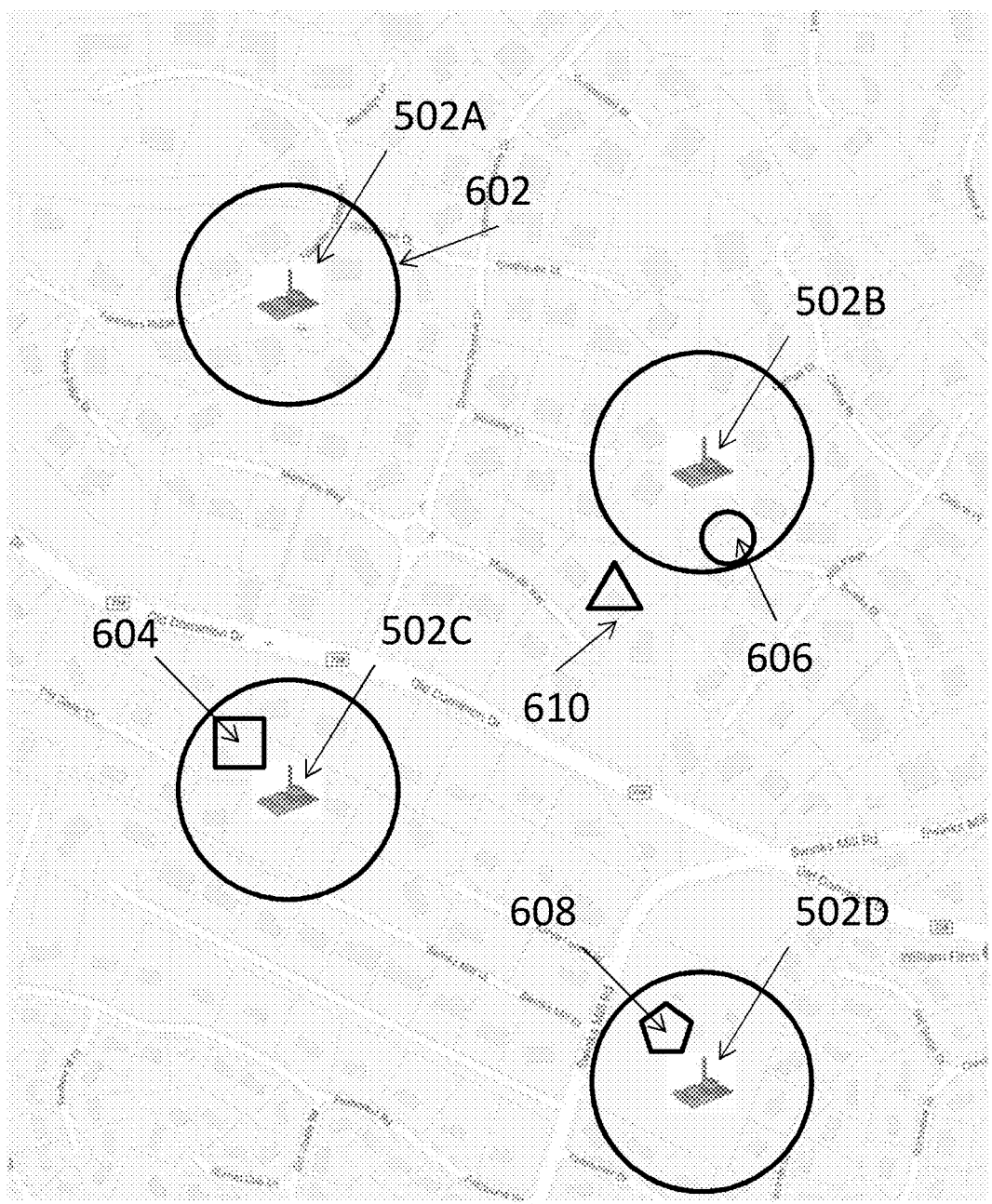
FIG. 6 illustrates locations of monitored individuals relative to a sensor network.

A non-limiting example of the components of such a service is shown in FIGS. 5A-B and 6. In FIG. 5A, sensors 502A receive paring signals from wireless devices that they detect. Each sensor 502 may utilize any wireless method(s) for communication (e.g., Bluetooth, Wi-Fi, etc.). Sensors 502 report the devices that they detect to a monitoring location with a database 506 through supporting communication infrastructure shown generally at 504.

FIG. 5B shows a sensor range 504 for a sensor 502 located at the restaurant at which the monitored persons A and B from FIG. 4 met. The sensor 502 detects any probe signals from the wireless devices that the monitored persons may be carrying, as well as any probe signals from any other wireless devices, and reports the same to database 506. By way of non-limiting example, the wireless devices may be the monitored person's cell phones, or any other cell phones in the area. If the monitoring devices 102 have the capability to emit probe signals, then those would also be detected and reported.

FIG. 6 shows sensors 502A-D deployed in particular areas of interest. Each sensor 502 has a range 602 that sensor 502 can detect probe signals in. Wireless devices 604 (shown as a square), 606 (shown as a circle) and 608 (shown as a pentagon) emit probe signals within range 602 such that sensor 502 will detect them, whereas wireless device 610 (shown as a triangle) is outside of range 602 of any sensor 502 and would not be detected.

Sensors 502 report the detection of wireless devices 604, 606 and 608 to a remote location where it is stored in a database 506. The reporting preferably includes, and the database 506 preferably stores, the received identifier of the wireless devices (e.g., MAC address), and an approximate time of the detection. Sensor 502 could also bundle times, such as report every probe signal provided in the last two minutes, such that the records may reflect approximate times of the probe signals rather than actual times. The invention is not limited to the nature or context of the time data or identification provided by sensors 502.

Database 506 also preferably stores location data giving some reference to location of the detected wireless device. Non-limiting examples include a location as provided by the wireless device (e.g., a GPS point as may be provided by the wireless device itself), a location of the sensor 502 (e.g. GPS data as provided by the sensor 502 when the wireless device was detected, or pre-established from an earlier time, such that the wireless device would be located within a detection range of the sensor 502), or even an identifier of the particular sensor 502 that can be correlated a with location as may be stored in other records.

The database 506 thus stores a record of a wireless device identifier, a time reference of an at least approximate time at which a probe signal from the wireless device was detected, and a location reference of an at least approximate position of the wireless device at the time of detection.

By way of non-limiting example, if the wireless devices in FIG. 6 emit a probe signal every five minutes, then at 1/18 at noon the database would reflect the following:

| Device ID | Time | Location |
|---|---|---|
| ID for square 604 | Jan. 18 12:00 PM | Sensor 502C |
| ID for circle 606 | Jan. 18 12:00 PM | Sensor 502B |
| ID for pentagon 608 | Jan. 18 12:00 PM | Sensor 502D |

Note
in the above chart the times are the same for ease of discussion, although unless the wireless devices are synchronized to emit probe signals at the same time (unlikely) the individual times may be different.

Figure 7:
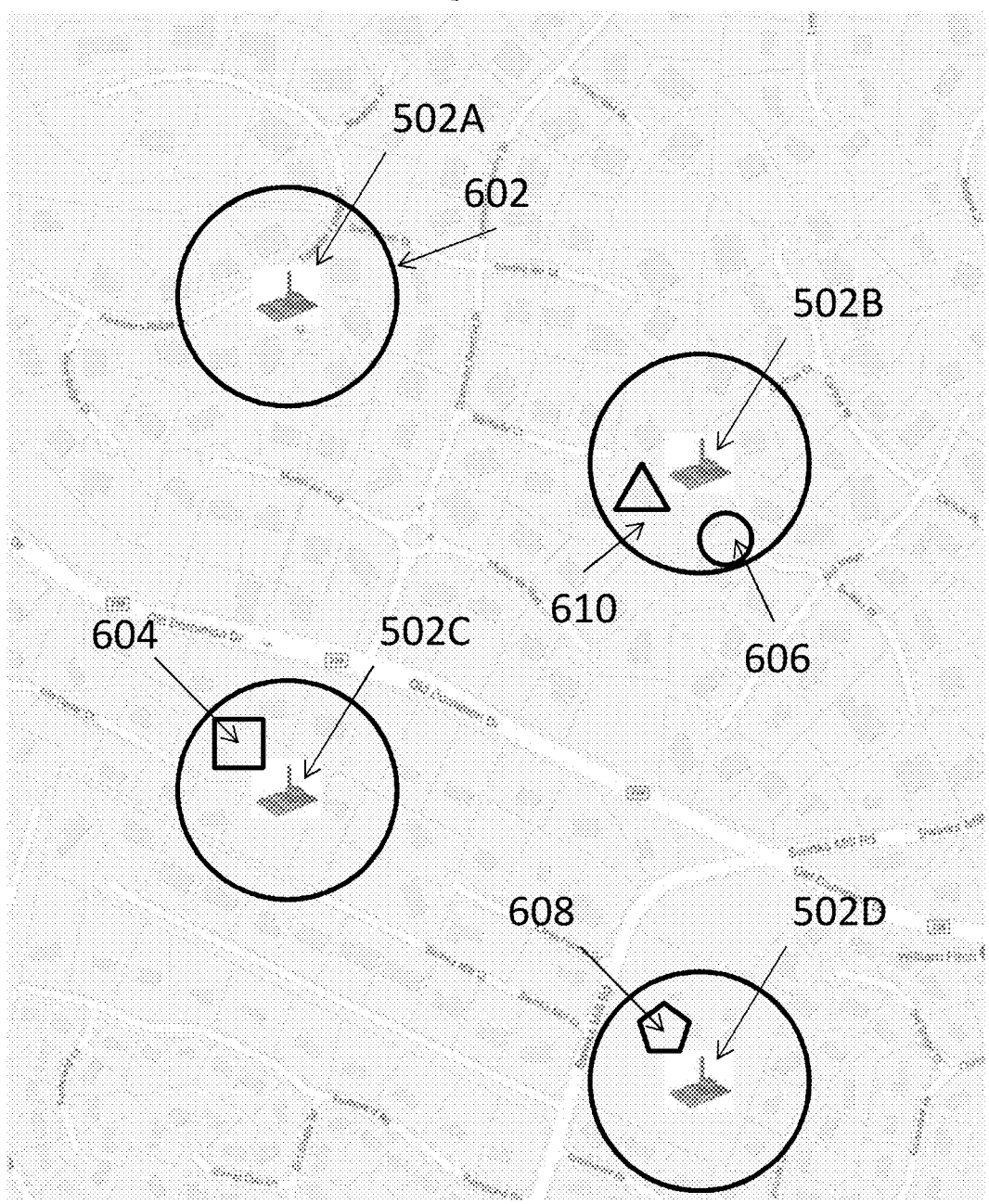
FIG. 7 illustrates locations of monitored individuals relative to a sensor network at a different time than FIG. 6.

Referring now to FIG. 7, wireless device 610 at 12:02 moves into range of sensor 502B, and its probe signals can thus be detected. If all of the wireless devices emit a probe signal at 12:05 on 1/18, then database 506 would reflect the following:

| Device ID | Time | Location |
|---|---|---|
| ID for square 604 | Jan. 18 12:00 PM | Sensor 502C |
| ID for circle 606 | Jan. 18 12:00 PM | Sensor 502B |
| ID for pentagon 608 | Jan. 18 12:00 PM | Sensor 502D |
| ID for square 604 | Jan. 18 12:05 PM | Sensor 502C |
| ID for circle 606 | Jan. 18 12:05 PM | Sensor 502B |
| ID for pentagon 608 | Jan. 18 12:05 PM | Sensor 502D |
| ID for triangle 610 | Jan. 18 12:05 PM | Sensor 502B |

The records would continue to grow over time.

Data may be stored differently from the above, such as a first recorded time of entry and last recorded time of entry. The invention is not limited to the nature of the records or the specific contents.

For multiple sensors 502 deployed over an area detecting wireless devices from the general population, these services collect massive amounts of movement data of wireless devices of the general population.

The collected data has a degree of anonymity, in that the probe signal from the wireless devices that are detected do not typically contain personal data that allows for easy identify of an individual. For example, these services typically do not have access to a list of users-MAC addresses (such data being maintained by the wireless cellular carriers), such that the probe signals do not typically reveal the identity of the user. Nonetheless, habits of the user as indicted by presence or movement of the wireless device can be discerned and leveraged. For example, if a particular wireless device is detected three times in the same week at the same store, the corresponding user could be classified as a frequent shopper and provided with specific discounts.

Tracking of Fugitives Using General Population Databases

As noted above, there are a variety of circumstances that establish a monitored person as a fugitive. A typical example is cutting the band 104 known as "cut and run" which causes monitoring device 102 to issue a bracelet gone alert signal to central monitoring location 310. Another example is destroying the monitored device. For purpose of brevity the below discussion in the context of a cut band 104, although it is to be understood that the invention is not limited to that specific circumstance.

In a cut and run scenario, a fugitive tends to engage in activity that involves, interacts with, or is proximate to wireless devices. For example, the fugitive may keep a cell phone with them, such as their original phone or a "burner" phone. In another example, even if the fugitive has no wireless device, they will tend to seek support from others (e.g., friends, family, accomplices) who have wireless devices. Embodiments of the invention cross reference prior location data of the fugitive with the global tracking databases to identify wireless devices that the monitored person previously had frequent contact with. Recent or current location of such wireless devices can then be identified from the global tracking database, and authorities can be dispatched to those locations.

Figure 8:
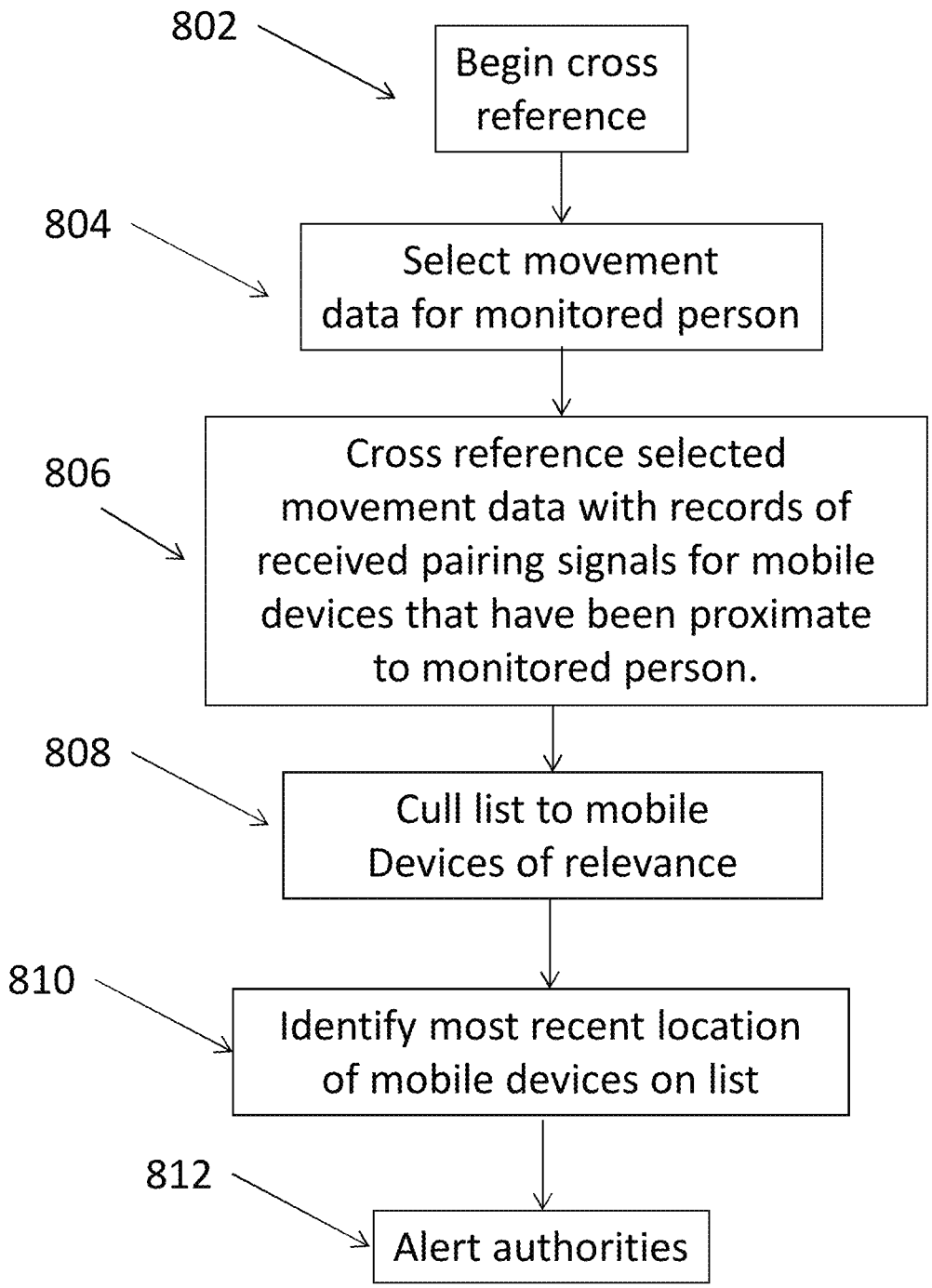
FIG. 8 is a flowchart of an embodiment of the invention.

FIG. 8 illustrates an example flowchart for the implemented methodology herein. The flowchart shown in FIG. 8 is provided by way of example, as there are a variety of ways to carry out the method. Additionally, while the example method is illustrated with a particular order of sequences, those of ordinary skill in the art will appreciate that FIG. 8 and the sequences shown therein can be executed in any order that accomplishes the technical advantages of the present disclosure and can include fewer or more sequences than illustrated.

As discussed above, the central authority has previously issued monitoring devices 102 to members of a monitored population, and collects and stores movement data for the members as reported by the monitoring devices 102 to establish a movement history of each of the monitored persons. At block 802, central monitoring location 310 initiates a search for wireless devices that have been in proximity to a monitoring device 102 over time.

At block 804, the central monitoring location 310 extracts from movement history for a particular monitored person a subset of movement for different times and locations of the monitored person. By way of example, the location of the monitored person every hour over the most recent five day period could be used. However, this may be too much data to process quickly, and thus instead the system may only look at the location of the monitored person at intervals, such as every two hours over the five days. More recent data may be more relevant, and as such more frequent data points may be compared to older points. The invention is not limited to the nature of the defined subset of movement data.

At block 806, the methodology cross references the subset of movement data with databases of detected probe signals of wireless devices to identify what wireless devices (if any) were proximate to the monitored person at the location/times of the subset of movement data. The databases which are cross referenced may be general population tracking databases 506 as discussed above, however the invention is not so limited. By way of non-limiting example, the database could be specific to certain types of wireless devices. The cross reference of block 806 may take a variety of forms, and may in part depend upon the content of the databases 506, as discussed in more detail below.

In theory all wireless devices that were identified at block 806 proximate to the monitored person at the location/times may be of interest, but as a practical matter this may generate too many hits for authorities to work with. It may therefore be preferable at block 808 to cull the list of all identified wireless devices to wireless devices of more significant interest, as these wireless devices are thus likely in the possession of either the monitored person or an associate with information relevant to locating the monitored person.

At block 810, the methodology determines one or more relevant locations for any of the wireless devices identified in the prior blocks. A relevant location could be a current location, a most recently detected location, and/or a particular location that has attributes of interest (e.g., a frequent gathering location, known location in which criminals congregate). The relevant location could by way of non-limiting example be a monitored individual's work, home, family member's home, or unknown location.

At block 812 the identified relevant location(s) can be provided to authorities to dispatch police or the like to investigate. The reporting may be by any known method, such as by way of non-limiting example, text, email, phone call, and/or report. Preferably the information is provided in real or near real time, although the invention is not so limited.

Figure 9:
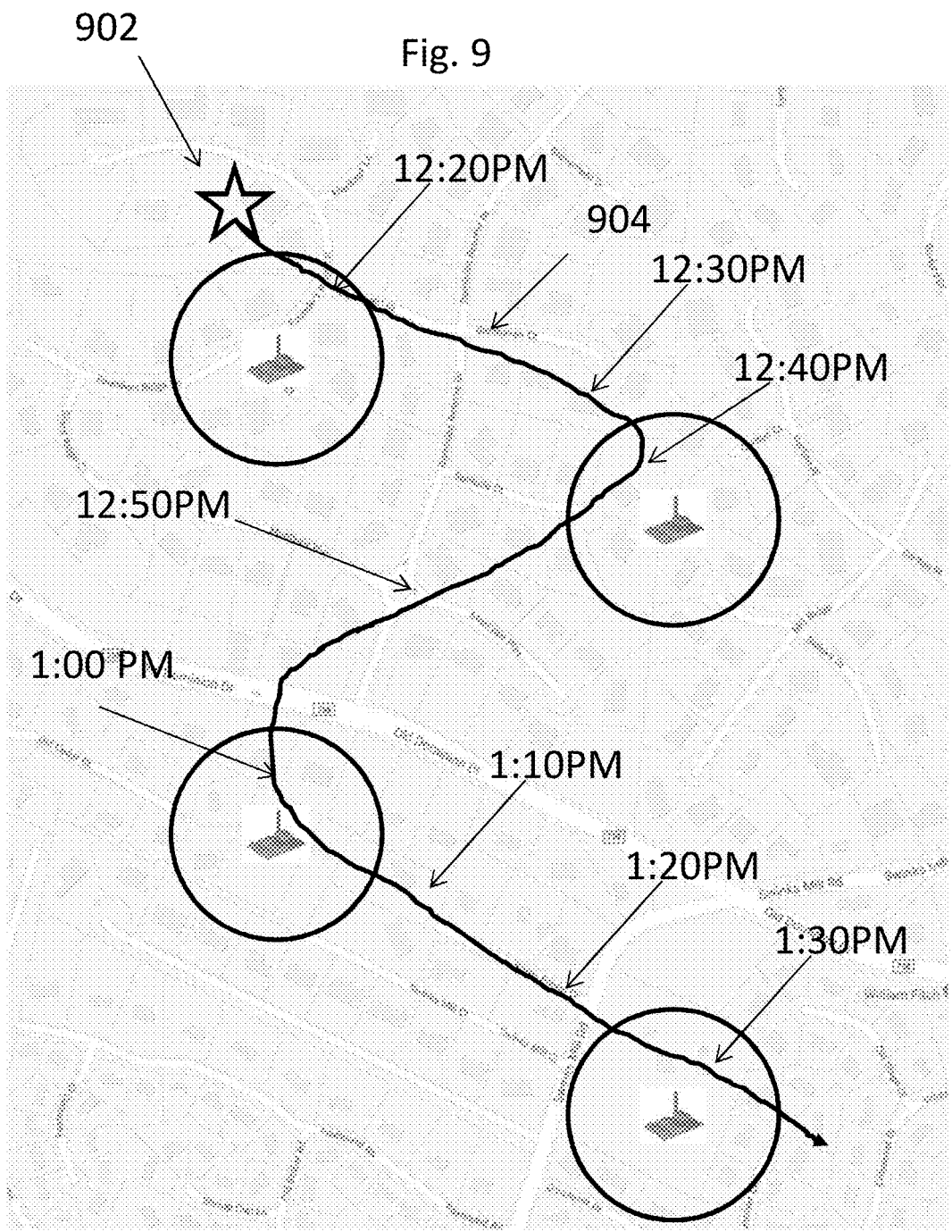
FIG. 9 illustrates movement of a monitored individual over time relative to the sensor network of FIG. 6.

The above blocks may be executed in a variety of ways, non-limiting examples of set forth below in the context of an example shown in FIGS. 9-14. FIG. 9 shows a route 904 taken by a monitored individual 902 between 12:20-1:30 on a day relative to the sensor deployment of FIG. 6, and a bracelet gone alert is received at 1:31 PM. FIGS. 10-14 show the location of the monitored person relative to wireless devices as detected by sensors 502 at particular times along route 904.

With respect to block 802, the decision to initiate the process may be periodic and/or reactive. A periodic decision may be performed on a schedule, such as every week. A reactive decision may be in response to a specific triggering event or circumstance(s), e.g., visit to a parolee office, or receipt of a bracelet gone alert signal transmitted by monitoring device 102 in response to a cut band 104. The decision may be made by users on consideration of all information (e.g., a monitored person has not reported in and other efforts to locate the monitored person have been ineffective) or automatically (e.g., in direct response to the bracelet gone signal). In the example of the FIGS. 9-14, block 802 is triggered by a bracelet gone alert, although the invention is not limited to the events that lead to the initiation of the search.

With respect to block 804, the selection of which times and/or locations for the subset of movement data to cross reference maybe based on a variety of criteria and/or the particular database(s) that would be considered. For example, if sensors 502 are typically deployed in public areas, then daytime hours may be more appropriate as it is less likely that wireless devices would be present at such locations at night. In another example, sensor 502 could be part of home monitoring device 304 (FIG. 3), and thus have logged wireless devices within the monitored person's home; in this case, the times of interest may be evenings or nights when the monitored person is more likely to be at home, such that the wireless devices that are detected more likely belong to the monitored person or people that the monitored person regularly associates with. In yet another example, the locations may be specific to areas in which there are known to be deployed sensors 502, as locations outside of those areas would not tend to yield useful data; FIGS. 10-13 reflect such a decision, as the locations/times are selected during which the path overlapped with sensors 502A-D of FIG. 6. The invention is not limited to any particular set of criteria on which the subset of movement data is selected.

Figure 10:
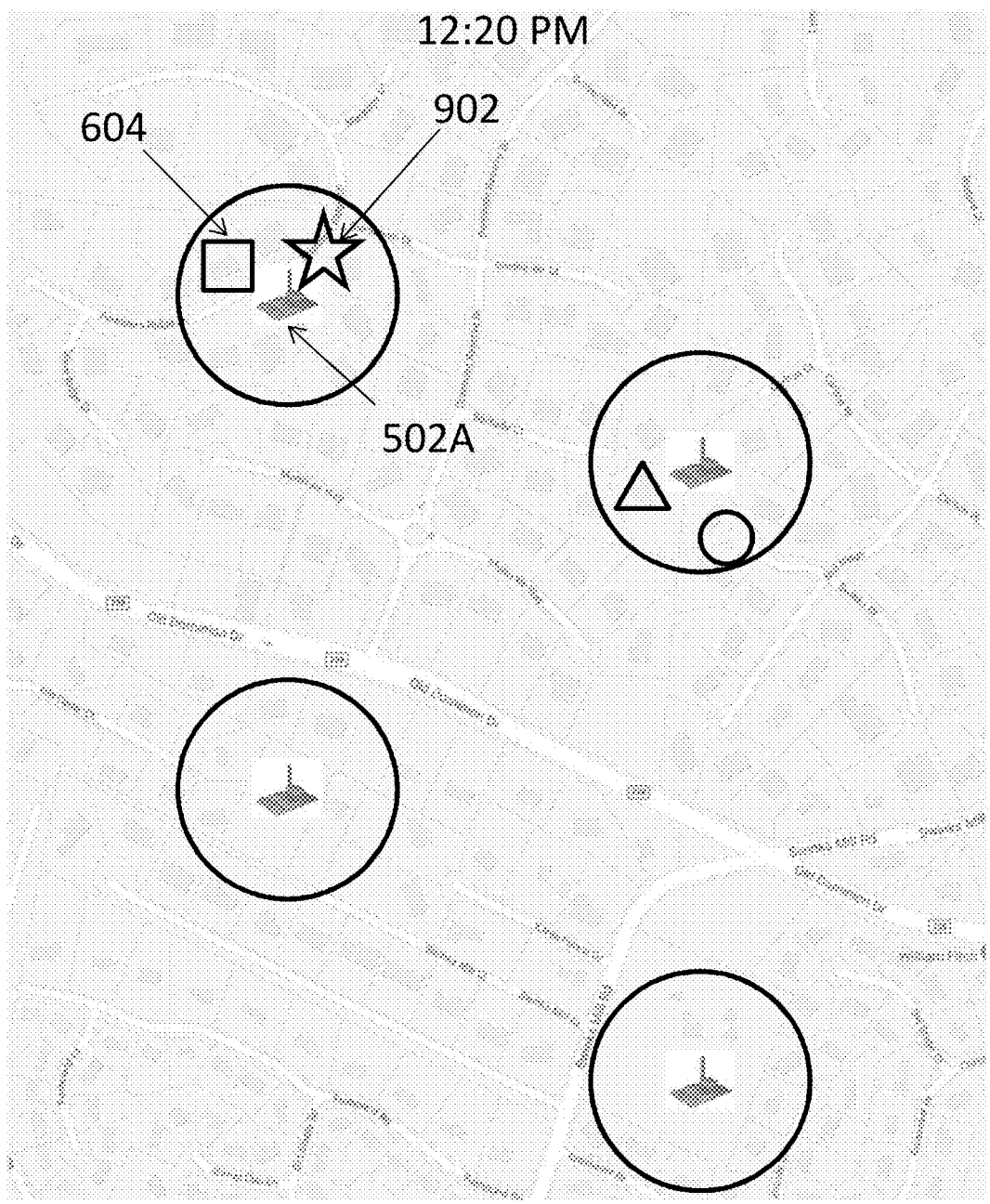
FIGS. 10-13 illustrates detecting probe signals from wireless devices over time relative to the sensor network of FIG. 6

With respect to block 806, the cross referencing will look for entries in the database 506 that are proximate in time and location to the subset of monitored data. Thus, FIG. 10 shows that monitored person 902 was within range of sensor 502A at 12:20 PM, the cross reference will search database 506 for wireless devices that were recorded as emitting a probe signal at that approximate location at that approximate time; wireless device 604 (square) is identified in that area at that time.

Figure 11:
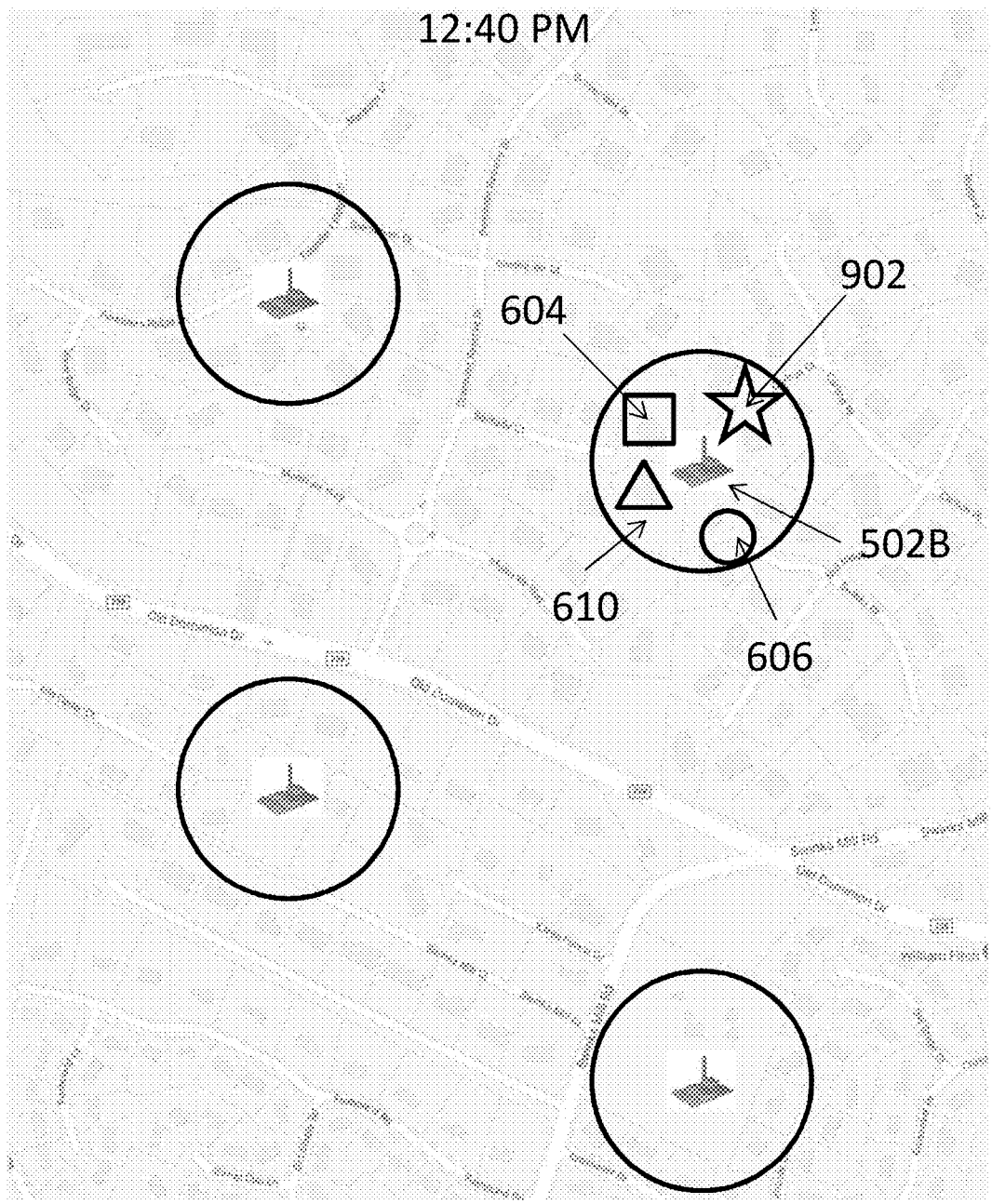
Figure 12:
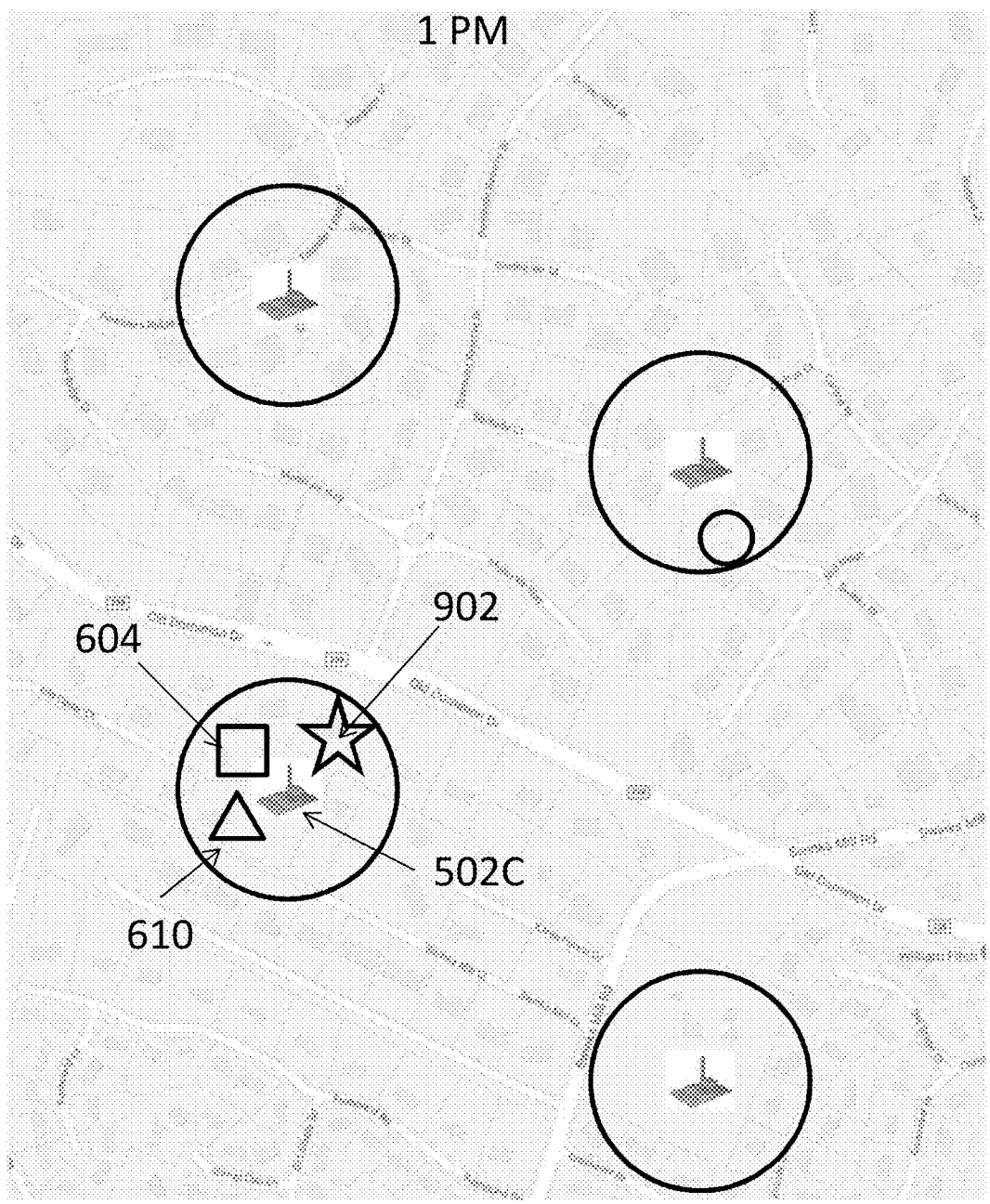
Figure 13:
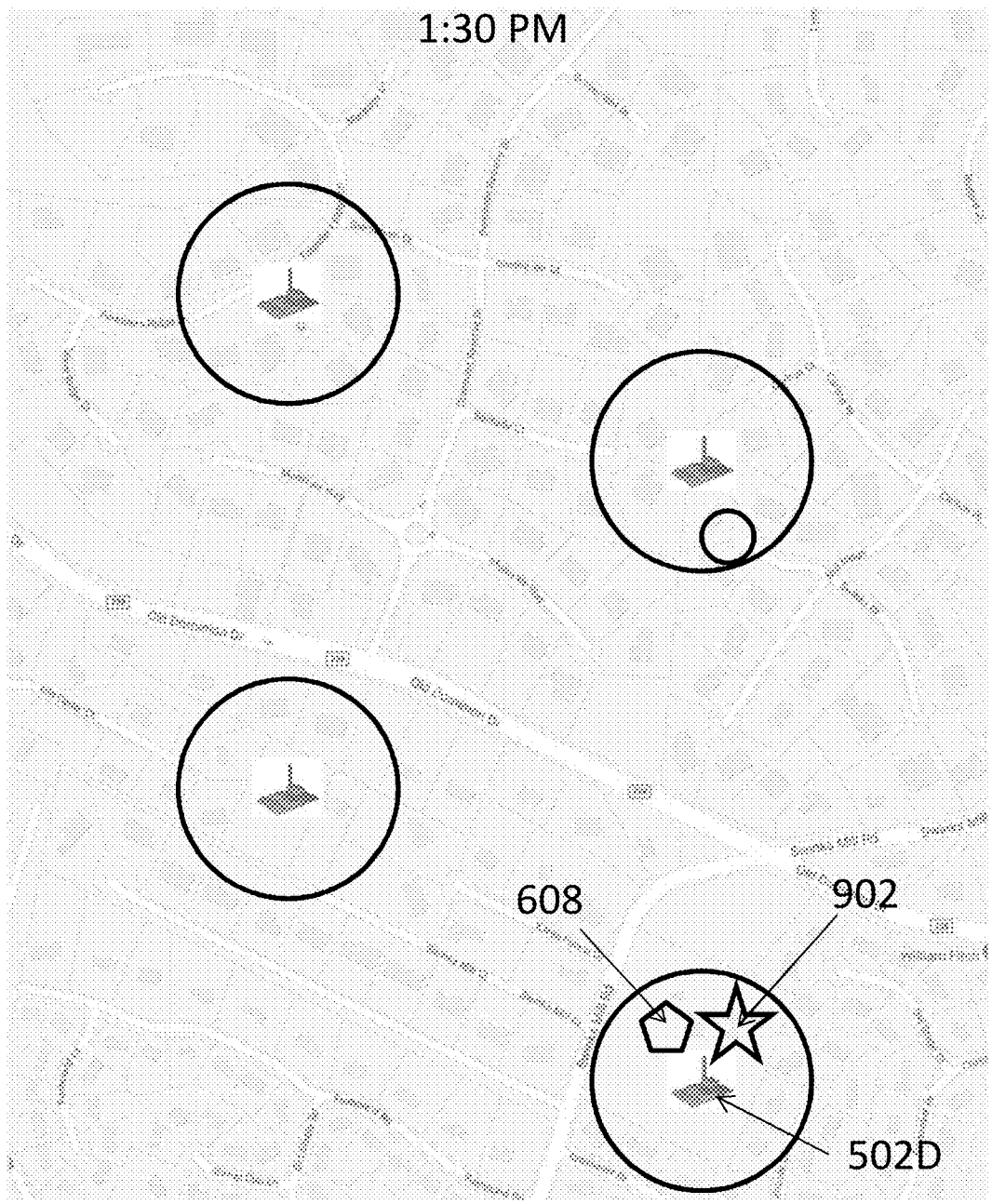

FIG. 11 shows monitored person 902 within range of sensor 502B at 12:40 PM, for which the cross reference identifies wireless devices 604 (square), 606 (circle), and 610 (triangle). FIG. 12 shows monitored person 902 within range of sensor 502C at 1 PM, for which the cross reference identifies wireless devices 604 (square) and 610 (triangle). FIG. 13 shows the monitored person 902 within range of sensor 502D at 1:30 PM, for which the cross reference identifies wireless device 608 (pentagon).

The above cross reference thus generates a list of wireless devices that were proximate to the monitored person over time, with wireless device 604 being present in three of the four checked locations. Any of these wireless devices may belong to the monitored person and/or their associates.

Nonetheless the list—which may represent all detected wireless devices that the monitored person encountered—is likely to be significantly over inclusive. Block 808 thus applies one or more predetermined rules to select wireless devices of with a higher probability of leading to the monitored person. A non-limiting example of a rule is how often the portable monitoring device encountered a particular wireless device. In the example of FIGS. 9-14, wireless device 604 (square) was consistently present with the monitored person; there is thus a high probability that the wireless device 604 is the fugitive's own mobile phone, or the phone of an associate who spends a considerable amount of time with the fugitive. Significant correlation between the selected movement data and wireless devices in the corresponding locations at the relevant times, such as 75% or higher, may thus be considered high priority.

In the same example, wireless device 610 (triangle) was encountered in two of the four cross references. This may indicate frequent contact with a particular person, but not the fugitive themselves or someone that they are typically with. Such moderate correlation, such as 30-75%, may be considered a medium priority.

In the same example, wireless devices 606 (circle) was encountered only once, and is thus likely to be an unaffiliated person coincidentally in the same geographic area; this minimum interaction could be either discounted or designated as low priority.

In the same example, wireless device 608 (pentagon) was encountered only once, and depending on the rules could similarly be discounted or designated a low priority as was the case with wireless device 606. However, this was the last detected wireless probe signal before the bracelet gone alert, and thus could represent a burner phone. Thus a wireless device detected closer in time to a specific event may have higher priority than a detection of a more remote time.

Another non-limiting example of a predetermined rule could be time of encounter. For example, a wireless device proximate to the personal monitoring device at 3 AM may be more likely to belong to the monitored person of a close associate who lives with the monitored person (e.g., significant other, family member, roommate). Another example of a rule may be extended periods of contact for individual encounters, or a combination of time over several encounters, if a wireless device is proximate to the personal monitoring device overnight it may also indicate it may be the fugitive's device or belong to an associate.

Another non-limiting example of a rule may be disregarding the detected wireless device if it is stationary. A device can be determined mobile if the records show it is in different places at different times, whereas a stationary device is consistently at the same location. While both yield useful data, information for stationary devices may be duplicative from what could be learned from the portable monitoring device's own reporting of its location data.

Another non-limiting example of a rule is the frequency of detection of a wireless, and/or the time of a connection with a wireless device. A wireless device that is detected more often than another and/or long periods of connection with a wireless device may be indicia of a relevant wireless device.

The rules may include weighting of particular factors. For example, an encounter at 3 AM may be given more weight than 3 PM, as daytime encounters may be coincidental whereas nighttime encounters may be consistent with living situations.

The above culling methodologies are provided by way of non-limiting example. The invention is not limited to the manner in which the methodology limits/prioritizes encountered wireless devices.

With respect to block 810, once wireless devices are identified as of interest (either from the results of block 806, or as culled for more relevant results in block 808), the methodology identifies one or more relevant locations where the monitored person or an associate (potentially with relevant information pertaining to the location of the monitored person) may be found.

A non-limiting example would be to search database 506 for the most recent detection of a probe signal for the identifier of the wireless device, which would generate a most recently known location. In another example, database 506 could be searched for a pattern of movement, which may yield clues for possible locations to investigate; for example if the wireless device is frequently present at a particular location, then authorities may want to investigate that location. Block 812 provides the relevant location(s) to authorities for investigation.

As discussed above the process beginning at block 802 may be periodic or reactive. If reactive, then then blocks 802-812 may occur at a particular time. If periodic, then the methodology may occur in parts, with a first part of data gathering (e.g., blocks 802-808) and the second part being reactive to fugitive or other status (e.g. blocks 810-812); in this context the first part may be run repeatedly over time, and the second part would only be used when needed.

The above methodology leverages a degree of anonymity in that wireless device identifiers do not directly identify the registered owner of the wireless device; between that and the public broadcast of the probe signals, the collection of data within database 506 does not raise privacy considerations as would be the case with the mobile carriers. The data is thus accessible (either openly or contractually with the provider) without need for a warrant. This leads to significantly improved response time in identifying relevant locations at block 810. However, the invention is not so limited, and in theory block 810 may include obtaining a current location of a wireless device from the local carrier.

To the extent that the above embodiments are discussed in terms of individual items or results (e.g., a personal monitoring device, a relevant location), this is for illustrative purposes only. It is to be understood that multiple items and/or results can be addressed simultaneously. For example, personal monitoring devices for the entire deployed population could be searched as discussed herein, and multiple relevant locations may be revealed and investigated.

According to another embodiment of the invention, the personal monitoring device 102 may itself incorporate the functionality of sensor 502 as part of short range modem 206, WAP detector 220, a dedicated component, and/or part of some other component. This methodology would report to central monitoring location 310 any detected probe signals along within range with location and time data, and central monitoring location would store that information. Central monitoring location could thus search its own records as part of at least blocks 802-808 of FIG. 8, such records likely being more complete than those of database 506 (as the personal monitoring device would have more accurate location information, and there would be no gaps in physical coverage as may exist between sensors 502). Block 810 could also at least in part be performed by central monitoring location 310 by using its deployed population of personal monitored devices 102 as an active sensor network, although as a practical matter the coverage may not be sufficient for meaningful results such that consultation with database 506 may still be desirable.

Figure 14:
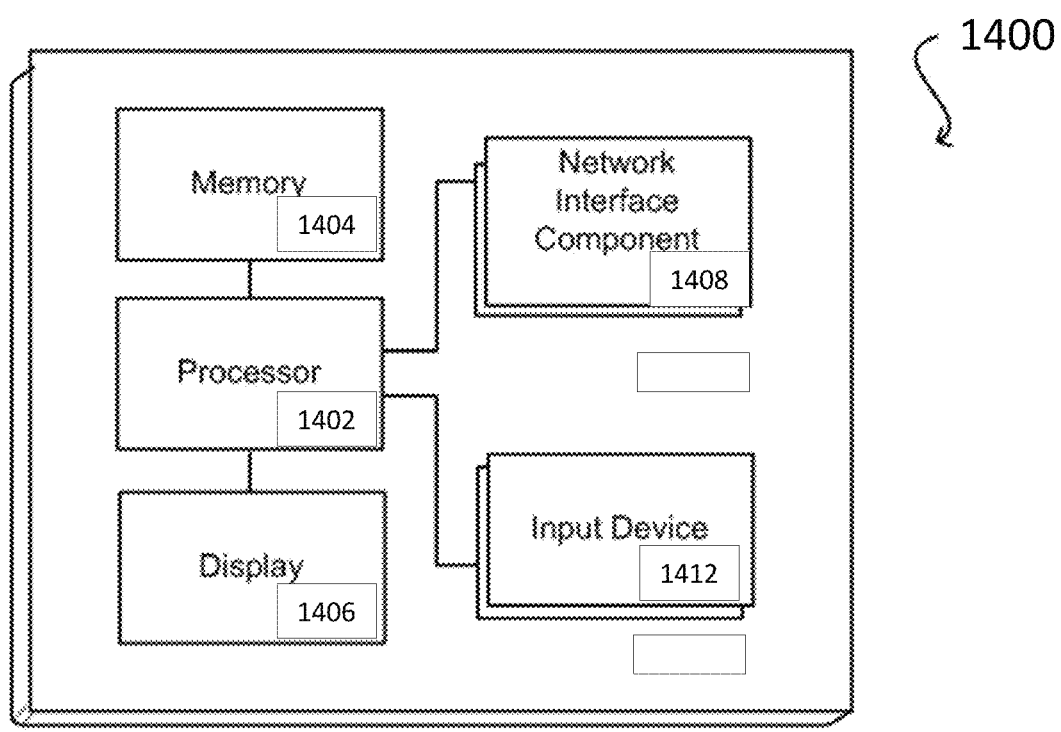
FIG. 14 illustrates a logical arrangement of a set of general components of an example computing device that can be utilized in accordance with various embodiments.

FIG. 14 illustrates a logical arrangement of a set of general components of an example computing device 1400 as could be used for the computer elements of monitoring device 102, database 506 and/or central monitoring location 310. In this example, the device includes a processor 1402 for executing instructions that can be stored in a memory device or element 1404. As would be apparent to one of ordinary skill in the art, the device can include many types of memory, data storage, or non-transitory computer-readable storage media, such as a first data storage for program instructions for execution by the processor 1402, a separate storage for images or data, a removable memory for sharing information with other devices, etc. The device typically will include some type of display element 1406, such as a touch screen or liquid crystal display (LCD), although devices such as portable media players might convey information via other means, such as through audio speakers. As discussed, the device in many embodiments will include at least one input element 1412 able to receive conventional input from a user. This conventional input can include, for example, a push button, touch pad, touch screen, keyboard, mouse, keypad, or any other such device or element whereby a user can input a command to the device. In some embodiments, the computing device 1400 of FIG. 14 can include one or more network interface elements 1408 for communicating over various networks, such as a Wi-Fi, Bluetooth, RF, wired, or wireless communication systems. The device in many embodiments can communicate with a network, such as the Internet, and may be able to communicate with other such devices.

Each computing device typically will include an operating system that provides executable program instructions for the general administration and operation of that device and typically will include computer-readable medium storing instructions that, when executed by a processor of the server, allow the computing device to perform its intended functions. Suitable implementations for the operating system and general functionality of the servers are known or commercially available and are readily implemented by individuals having ordinary skill in the art, particularly in light of the disclosure herein.

Various embodiments discussed or suggested herein can be implemented in a wide variety of operating environments, which in some cases can include one or more user computers, computing devices, or processing devices which can be used to operate any of a number of applications. User or client devices can include any of a number of general purpose individual computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments where the computing device includes a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C#or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, an individual of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for locating a fugitive with a disabled personal monitoring device, comprising:
   receiving location data from a personal monitoring device to thereby create a movement history of the personal monitoring device of a monitored individual;
   cross referencing at least a portion of the movement history of the personal monitoring device with a record of detected probe signals emitted by wireless devices to thereby identify any wireless devices that emitted probe signals at a location that was proximate to the personal monitoring device;
   selecting, from the results of the cross referencing, a wireless device identified by the cross referencing that had significant contact per predefined rules to the personal monitoring device;
   determining a relevant location of the selected wireless device; and
   notifying a supervising authority of the relevant location.

2. The method of claim 1, wherein the receiving is in response to a signal representing that the personal monitoring device has been disabled.

3. The method of claim 1, wherein:
   the receiving, cross referencing and selecting occur on a predetermined schedule; and
   the determining is in response to a signal representing that the personal monitoring device has been disabled.

4. The method of claim 1, wherein the at least a portion of the movement history includes a plurality of location/time entries, and the cross referencing comprises identifying in the record any wireless devices that were detected for emitting probe signals within range of a sensor proximate to any of the location/time entries at a corresponding time.

5. The method of claim 4, wherein the sensor is part of a deployed sensor network.

6. The method of claim 4, wherein the sensor is part of the personal monitoring device, and the receiving location data includes receiving data from the sensor.

7. The method of claim 1, wherein the selecting comprises prioritizing wireless devices for which the personal monitoring device had more significant contact than other wireless devices with less contact.

8. The method of claim 1, wherein the selecting comprises prioritizing wireless devices detected during nighttime hours.

9. The method of claim 1, wherein the relevant location is a last known location of the wireless device.

10. The method of claim 1, wherein the relevant location is a last known location of the wireless device as reflected by the record of detected probe signals.

11. The method of claim 1, wherein the relevant location comprises one of: work, home, family member's home, unknown location.

12. The method of claim 1, wherein the wireless device is a cellular phone.

13. The method of claim 12, wherein the emitted probe signals are transmitted by the cellular phone to connect with internet access points to access the internet.

14. A system for locating a fugitive with a disabled personal monitoring device, comprising:
   a personal monitoring device;
   a central monitoring location having electronic computer hardware in combination with software programmed to perform operations comprising:

receiving location data from the personal monitoring device to thereby create a movement history of the personal monitoring device of a monitored individual;

cross referencing at least a portion of the movement history of the personal monitoring device with a record of detected probe signals emitted by wireless devices to thereby identify any wireless devices that emitted probe signals at a location that was proximate to the personal monitoring device;

selecting, from the results of the cross referencing, a wireless device identified by the cross referencing that had significant contact per predefined rules to the personal monitoring device;

determining a relevant location of the selected wireless device;

notifying a supervising authority of the relevant location.

15. The system of claim 14, wherein the receiving is in response to a signal representing that the personal monitoring device has been disabled.

16. The system of claim 14, wherein:

the receiving, cross referencing and selecting occur on a predetermined schedule; and the determining is in response to a signal representing that the personal monitoring device has been disabled.

17. The system of claim 14, wherein the at least a portion of the movement history includes a plurality of location/time entries, and the cross referencing comprises identifying in the record any wireless devices that were detected for emitting probe signals within range of a sensor proximate to any of the location/time entries at a corresponding time.

18. The system of claim 17, wherein the sensor is part of a deployed sensor network.

19. The system of claim 17, wherein the sensor is part of the personal monitoring device, and the receiving location data includes receiving data from the sensor.

20. The system of claim 14, wherein the selecting comprises prioritizing wireless devices for which the personal monitoring device had more significant contact than other wireless devices with less contact.

21. The system of claim 14, wherein the selecting comprises prioritizing wireless devices detected during nighttime hours.

22. The system of claim 14, wherein the relevant location is a last known location of the wireless device.

23. The system of claim 14, wherein the relevant location is a last known location of the wireless device as reflected by the record of detected probe signals.

24. The system of claim 14, wherein the relevant location comprises one of: work, home, family member's home, unknown location.

25. The system of claim 14, wherein the wireless device is a cellular phone.

26. The system of claim 25, wherein the emitted probe signals are transmitted by the cellular phone to connect with internet access points with internet access points to access the internet.

* * * * *